United States Patent
Neuhaeuser

(10) Patent No.: US 12,532,153 B2
(45) Date of Patent: Jan. 20, 2026

(54) METHOD OF MANAGING A COMMUNICATION FUNCTION IN A USER EQUIPMENT

(71) Applicant: Bayerische Motoren Werke Aktiengesellschaft, Munich (DE)

(72) Inventor: Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 326 days.

(21) Appl. No.: 18/114,496

(22) Filed: Feb. 27, 2023

(65) Prior Publication Data

US 2023/0276221 A1 Aug. 31, 2023

(30) Foreign Application Priority Data

Feb. 28, 2022 (EP) ..................................... 22159306

(51) Int. Cl.
*H04W 8/18* (2009.01)
*H04W 48/02* (2009.01)

(52) U.S. Cl.
CPC ............. *H04W 8/18* (2013.01); *H04W 48/02* (2013.01)

(58) Field of Classification Search
CPC ................................ H04W 8/18; H04W 48/02
USPC ...................................................... 455/414.1
See application file for complete search history.

(56) References Cited

U.S. PATENT DOCUMENTS

| | | | |
|---|---|---|---|
| 10,530,756 B1 * | 1/2020 | Youngs | H04W 12/08 |
| 2012/0108204 A1 * | 5/2012 | Schell | H04W 8/205 |
| | | | 455/411 |
| 2014/0165155 A1 * | 6/2014 | Zhang | H04L 41/28 |
| | | | 726/4 |
| 2016/0149903 A1 * | 5/2016 | Suh | H04L 63/0428 |
| | | | 713/156 |
| 2016/0318524 A1 * | 11/2016 | Ricci | G06Q 30/0633 |
| 2016/0374134 A1 * | 12/2016 | Kweon | H04W 4/70 |
| 2018/0255451 A1 * | 9/2018 | Fan | H04W 12/08 |
| 2019/0191298 A1 * | 6/2019 | Kim | H04W 4/50 |
| 2020/0092711 A1 | 3/2020 | Chen et al. | |
| 2020/0359212 A1 | 11/2020 | Chen et al. | |
| 2021/0250430 A1 * | 8/2021 | Moon | H04W 8/183 |
| 2022/0014900 A1 * | 1/2022 | Gandhi | H04W 12/40 |

OTHER PUBLICATIONS

Extended European Search Report issued in European Application No. 22159306.4 dated Aug. 16, 2022 (nine (9) pages).
"Automotive Identity, High Level Description", GSM Association, GSMA Floor, The Walbrook Building 25, Walbrook London, UK, Jun. 10, 2021, pp. 1-36, XP040721025 (36 pages).

* cited by examiner

*Primary Examiner* — Mark G. Pannell
(74) *Attorney, Agent, or Firm* — Crowell & Moring LLP

(57) ABSTRACT

The present disclosure relates to a method of managing a communication function in a user equipment. The user equipment has a communication profile associated with a first user. According to the method a first user input indicating that use of the communication profile should be prevented is received at a mobile terminal, the mobile terminal sends a use prevention request to a first server based on the first user input, the first server sends a use prevention command to the user equipment, and the user equipment prevents use of the communication profile based on the use prevention command.

17 Claims, 4 Drawing Sheets

METHOD OF MANAGING A COMMUNICATION FUNCTION IN A USER EQUIPMENT

CROSS REFERENCE TO RELATED APPLICATION

This application claims priority under 35 U.S.C. § 119 from European Patent Application No. 22159306.4, filed Feb. 28, 2022, the entire disclosure of which is herein expressly incorporated by reference.

BACKGROUND AND SUMMARY

Embodiments of the present disclosure relate to a method of managing a communication function in a user equipment, a computer readable storage medium, and a system for managing a communication function in a user equipment. Embodiments of the present disclosure relate more particularly to the management of communication profiles, such as embedded Subscriber Identity Module (eSIM) profiles, in user equipment, particularly in vehicles.

The use of wireless communication systems is rapidly increasing. In particular, a user may have a variety of devices that should be equipped with communication functions. Such devices may include a smartphone, a tablet, a smart watch, and a car. Due to certain restrictions imposed by a mobile network operator, it may be difficult or even impossible to flexibly provide personalized communication functions to user devices.

In view of the above, a new method of managing a communication function in a user equipment, a computer readable storage medium, and a system for managing a communication function in a user equipment, that overcome at least some of the problems in the art are beneficial.

In light of the above, a method of managing a communication function in a user equipment, a computer readable storage medium, and a system for managing a communication function in a user equipment are provided.

It is an object of the present disclosure to flexibly enable and disable a communication function in a user equipment. In particular, it is an object of the present disclosure to flexibly provide personalized communication functions for different user equipment and/or different users.

The objects are solved by the features of the independent claims. Preferred embodiments are defined in the dependent claims.

According to an independent aspect of the present disclosure, a method of managing a communication function in a user equipment is provided. The user equipment has a communication profile associated with a first user. The method includes: receiving, at a mobile terminal, a first user input indicating that use of the communication profile should be prevented; sending, by the mobile terminal, a use prevention request to a first server based on the first user input; sending, by the first server, a use prevention command to the user equipment; and preventing, by the user equipment, use of the communication profile based on the use prevention command.

The mobile terminal may be a mobile terminal of the first user that is wirelessly connected to the first server. The wireless connection may be established via a mobile network (e.g., a cellular network such as a 5G network), Wi-Fi, etc., but the present disclosure is not limited to these examples.

Preferably, the first user input is received from the first user. For example, the first user may use an application (App) on his/her mobile terminal to (e.g., temporarily) prevent the use of the communication profile, for example, by a second user different from the first user.

The first user may be a user who is not currently using the user equipment (e.g., the first user may not be near or inside the user equipment), and the second user may be a user who is currently using the user equipment. For example, the first user may lend his/her car to the second user, where the first user does not want the second user to use his/her communication profile. The first user can then remotely prevent the second user from using the communication profile.

According to some embodiments, which can be combined with other embodiments described herein, preventing, by the user equipment, use of the communication profile includes: preventing, by the user equipment, enabling of the communication profile if the communication profile has not been enabled yet. For example, if the second user (or a user equipment access device carried by the second user) has not yet logged in to the user equipment, the enabling of the communication profile can be prevented as a precaution.

According to some embodiments, which can be combined with other embodiments described herein, preventing, by the user equipment, use of the communication profile includes: disabling, by the user equipment, the communication profile if the communication profile has been enabled. For example, if the second user (or a user equipment access device carried by the second user) has already logged in to the user equipment, the communication profile enabled by the login can be disabled again.

According to some embodiments, which can be combined with other embodiments described herein, the method further includes receiving, at the user equipment, a login request.

Preferably, the login request is received from the second user or a user equipment access device (e.g., a car key) associated with the first user and carried by the second user.

Preferably, if the use prevention command has not been received from the first server, the method includes enabling the communication profile based on the login request.

Preferably, if the use prevention command has been received from the first server, the method includes preventing enabling the communication profile.

According to some embodiments, which can be combined with other embodiments described herein, the method further includes receiving, at the mobile terminal (of the first user), a second user input (by the first user) indicating that the use of the communication profile should no longer be prevented; sending, by the mobile terminal, a use permission request to the first server based on the second user input; sending, by the first server, a use permission command to the user equipment; and permitting, by the user equipment, use of the communication profile. Accordingly, only the first user may permit the user of the communication profile.

Preferably, permitting, by the user equipment, use of the communication profile includes: enabling the communication profile. Accordingly, the previously prevented use of the communication profile may be allowed again, e.g., if the first user uses the user equipment after the second user has used it. In some embodiments, only the first user can unlock the communication profile. This can be done on the mobile terminal from outside the vehicle to ensure that it cannot be simply enabled again in the vehicle by someone else.

In the above exemplary embodiments, the user equipment has (e.g., stored) the communication profile associated with the first user. The method of the embodiments of the present disclosure can include a process preceding the steps described above to provide the communication profile in the user equipment. An exemplary process for providing the communication profile in the user equipment, which can be initiated by the first user, is described in the following.

For providing the communication profile in the user equipment, the method may include: receiving, at the user equipment, a login request (e.g., from the first user) to log the first user in to the user equipment; and determining, by the user equipment, based on the login, whether the user equipment has (e.g., stored) a communication profile associated with the first user.

Preferably, the login request is received at a user interface of the user equipment, or at an external entity connected to the user equipment. The external entity may be, for example, the mobile terminal of the first user that is wirelessly connected to the user equipment. The wireless connection may be established via a mobile network (e.g., a cellular network such as a 5G network), near field communication, Wi-Fi, or Bluetooth, but the present disclosure is not limited to these examples. For example, the external entity may be connected to the user equipment by one or more cables.

If it is determined that the user equipment already has a communication profile associated with the first user, the method includes enabling the stored communication profile to provide the communication function for the first user. The communication profile may be stored in the user equipment. In further embodiments, the user equipment may have a plurality of SIM cards (i.e., physical SIM cards) each being associated or associable with a respective communication profile. The plurality of SIM cards may be exchangeable and/or may be provided in an "exchange magazine".

If it is determined that the user equipment does not have a communication profile associated with the first user, the method includes: sending, by the user equipment, a first request to the first server to request support information for obtaining a communication profile associated with the first user; receiving, at the user equipment, the support information from the first server; and obtaining, by the user equipment, the communication profile from the first server or a second server different from the first server based on the support information.

According to some embodiments, which can be combined with other embodiments described herein, the communication profile is an eSIM profile of the first user. Additionally, or alternatively, the communication profile is a personalized communication profile of the first user.

The eSIM (embedded subscriber identity module) is a standardized procedure for the secure embedding of subscriber information in a module of a telecommunications device. For communication via eSIM, security or data confidentiality is crucial. For this purpose, the module contains a standardized digital certificate. Worldwide, a large number of different certificates exist, wherein a certain type of eSIM only works with a certain type of certificate.

The embodiments of the present disclosure are not limited to eSIM profiles, and other present or future network identifiers can benefit from the embodiments of the present disclosure.

According to some embodiments, which can be combined with other embodiments described herein, the method further includes enabling, by the user equipment, the communication profile obtained from the first server or second server.

According to some embodiments, which can be combined with other embodiments described herein, the enablement of the previously existing (e.g., stored) or downloaded communication profile is performed or granted only if the first user is positively authenticated during the login process. The authentication may use a particular security level. For example, authentication may require the first user to enter a password or key or perform Face ID. In some implementations, auto login without further protection may not be sufficient to enable the previously existing (e.g., stored) or downloaded communication profile.

According to some embodiments, which can be combined with other embodiments described herein, the first server is a management server or backend for managing a plurality of UE devices. For example, the first server can be owned and/or operated by a manufacturer of the UE devices, such as a car manufacturer. Accordingly, the first server can be an Original Equipment Manufacturer (OEM) server or backend. However, the present disclosure is not limited thereto, and the first server may be owned and/or operated by another third party.

According to some embodiments, which can be combined with other embodiments described herein, the second server is a mobile network operator, MNO, (or mobile virtual network operator, MVNO) server or backend. The MNO or MVNO can provide the communication profile for the first user which should be downloaded and installed in the user equipment.

The MNO may also be referred to as a wireless service provider, wireless carrier, cellular company, or mobile network carrier, and is a provider of wireless communications services that owns or controls all the elements necessary to sell and deliver services to a user. In particular, the MNO owns or controls the elements of the network infrastructure necessary to provide services to subscribers (users) over a licensed spectrum.

The user equipment and the first server communicate via a transmission medium, such as a network. In a preferred embodiment, the network is a mobile network. The transmission medium may use any of various wireless communication technologies, or telecommunication standards, such as GSM, UMTS, LTE, LTE-Advanced (LTE-A), 5G, HSPA, and the like. A communication via future telecommunication standards is possible.

In some embodiments, the user equipment and the second server may communicate via the same network used for communication with the first server or a different network. In alternative embodiments, the user equipment does not communicate with the second server or communicates with the second server via the first server.

According to some embodiments, which can be combined with other embodiments described herein, the first request includes at least one of user equipment identification information (e.g., a Vehicle Identification Number, VIN), Subscriber Identity Module information (e.g., an EID), and user information. For example, the first request may always include the user information, and may optionally include the user equipment identification information and/or the Subscriber Identity Module information. The user information may be sent to the first server so that the first request can be mapped to a logged-in user. In some embodiments, the user information can be a Customer (C)-ID.

According to some embodiments, which can be combined with other embodiments described herein, the support information includes an activation code for the communication profile.

The activation code can be used to request the communication profile from the first server or the second server, in particular from an MNO. For example, the activation code may be sent to the UE's Local Profile Assistant (LPA), wherein the LPA uses the activation code to request a communication profile from the MNO, in particular a SM- DP+ of the MNO. In some embodiment, the activation code may include, or consist of, two parts: an SM-DP+ Address (e.g., a Fully Qualified Domain Name of the SM-DP+) and a matching ID or activation code token.

According to some embodiments, which can be combined with other embodiments described herein, the support information further includes at least one of Subscriber Identity Module information (e.g., an EID), a communication profile type (e.g., "personal" if the profile is assignable to one user only, or "default" if the profile is assignable to different users), user information (e.g., the C-ID), and a confirmation code (optional). The confirmation code can be used by the second server to verify that the first user wants to use the communication profile in the user equipment.

According to some embodiments, which can be combined with other embodiments described herein, the step of obtaining, by the user equipment, the communication profile from the first server or a second server based on the support information includes sending, by the user equipment, a second request to the first server to request a download of the communication profile from the first server.

Preferably, the first server obtains the communication profile from the second server.

In further embodiments, which can be combined with other embodiments described herein, the step of obtaining, by the user equipment, the communication profile from the first server or a second server based on the support information includes sending, by the user equipment, a second request to the second server to request a download of the communication profile (e.g., directly) from the second server.

According to some embodiments, which can be combined with other embodiments described herein, the method further includes determining, by the user equipment, whether sufficient memory is available, e.g., on a storage medium of the user equipment, for installation of the communication profile.

The term "sufficient memory" is to be understood in the sense that the memory contains sufficient free storage to install and enable the communication profile. In some embodiments, the memory or total memory available for storing communication profiles may by preset. Optionally, the memory or total memory available for storing communication profiles may be changeable, e.g., in the user equipment and/or by the first server.

Preferably, the memory is provided by (a storage medium of) a Universal Integrated Circuit Card, UICC, also known as SIM card. In particular, the UICC may be an eUICC. The eUICC is a secure element that can contain one or more communication profiles, such as eSIM profiles. Each communication profile enables the eUICC to function in the same way as a removable SIM issued by the operator that created it. An eUICC may be built using any form factor from the traditional removable card to embedded formats soldered into devices.

According to some embodiments, which can be combined with other embodiments described herein, the method further includes, if it is determined that sufficient memory is available, installing the communication profile obtained from the first server or second server. The installing of the communication profile may be done according to the GSMA standard.

According to some embodiments, which can be combined with other embodiments described herein, the method further includes, if it is determined that sufficient memory is not available, deleting at least one other communication profile stored in the user equipment; and installing the communication profile obtained from the first server or second server. In other words, at least part of the storage medium is erased to provide sufficient capacity at least for the installation of the first user's new communication profile.

According to some embodiments, which can be combined with other embodiments described herein, the at least one other communication profile is selected from the group including, or consisting of, an unknown communication profile, a least used communication profile, a recently least used communication profile, an oldest communication profile, and combinations thereof.

According to some embodiments, which can be combined with other embodiments described herein, the method further includes receiving, at the user equipment, a logout request to log the first user or the second user out, in particular wherein the logout request is received via user input or automatically triggered by one or more events; and disabling the communication profile.

Preferably, the logout request is received at a user interface of the user equipment, or at an external entity connected to the user equipment. The external entity may be, for example, a mobile terminal that is wirelessly connected to the user equipment. The wireless connection may be established via a mobile network (e.g., a cellular network such as a 5G network), near field communication, Wi-Fi, or Bluetooth, but the present disclosure is not limited to these examples. In further embodiments, the logout request may be (e.g., automatically) triggered without explicit input from the first user or the second user by one or more events. For example, the logout request may be triggered when the first user or the second leaves the vehicle, closes the vehicle, switches to another communication provide, and the like.

According to some embodiments, which can be combined with other embodiments described herein, the method further includes receiving, at the user equipment, a communication profile deletion request (e.g., from the first user or the second user), in particular wherein the deletion request is received via user input or automatically triggered by one or more events; and deleting the communication profile according to the communication profile deletion request.

Preferably, the deletion request is received at a user interface of the user equipment, or at an external entity connected to the user equipment. The external entity may be, for example, a mobile terminal that is wirelessly connected to the user equipment. The wireless connection may be established via a mobile network (e.g., a cellular network such as a 5G network), near field communication, Wi-Fi, or Bluetooth, but the present disclosure is not limited to these examples. In further embodiments, the deletion request may be (e.g., automatically) triggered without explicit input from the first user or the second user by one or more events. For example, the deletion request may be triggered when the first user or the second user leaves the vehicle, closes the vehicle, switches to another communication provide, and the like.

According to another independent aspect of the present disclosure, a machine-readable storage medium is provided. The machine-readable storage medium includes instructions executable by one or more processors to implement the method of managing a communication function in a user equipment of the embodiments of the present disclosure.

The term "machine-readable storage medium" includes various types of non-transitory memory devices or storage devices. The term "storage medium" is intended to include a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The storage medium may include other types of non-transitory memory as well or combinations thereof.

According to another independent aspect of the present disclosure, a system is provided. The system includes one or more processors; and a memory (e.g., the above machine-readable storage medium) coupled to the one or more processors and comprising instructions executable by the one or more processors to implement the method of managing a communication function in a user equipment of the embodiments of the present disclosure.

According to another independent aspect of the present disclosure, a management module for a communication module is provided. The management module includes a communication interface configured for communication with the communication module and a server; and a processor module.

The communication interface may be configured to receive at least the use prevention command from the first server.

The processor module may be configured to prevent the use of the communication profile based on the use prevention command.

According to another independent aspect of the present disclosure, a user equipment is provided. The user equipment includes the management module and the communication module.

According to some embodiments, which can be combined with other embodiments described herein, the user equipment is selected from the group including, or consisting of, vehicles and mobile terminals.

The term "user equipment" (UE) particularly includes computer devices which are mobile (e.g., vehicles) and/or portable (e.g., mobile terminals) and which are configured for wireless communication. Examples of UE devices include mobile telephones or smart phones, portable gaming devices, laptops, wearable devices (e.g. smart watches, smart glasses, smart shoes), PDAs, portable Internet devices, music players, data storage devices, or other handheld devices, etc. In general, the term "UE" or "UE device" can be broadly defined to encompass any electronic, computing, and/or telecommunications device (or combination of devices) which is capable of wireless communication.

The term "vehicle" includes passenger cars, trucks, buses, campers, motorcycles, aircrafts, drones, ships, trains, etc., which are used to transport people, goods, etc. In particular, the term includes motor vehicles for the transport of persons.

The term "mobile terminal" includes in particular smartphones, but also other mobile telephones or cell phones, personal digital assistants (PDAs), tablet PCs, smart watches, smart glasses, and all current and future electronic devices that are equipped with communication technology.

Embodiments are also directed at devices for carrying out the disclosed methods and include device parts for performing each described method aspect. These method aspects may be performed by way of hardware components, a computer programmed by appropriate software, by any combination of the two or in any other manner. Furthermore, embodiments according to the disclosure are also directed at methods for operating the described user equipment and server(s). The disclosure includes method aspects for carrying out every function of the user equipment and server(s).

Further aspects, benefits, and features of the present disclosure are apparent from the claims, the description, and the accompanying drawings.

So that the manner in which the above recited features of the present disclosure can be understood in detail, a more particular description of the disclosure, briefly summarized above, may be had by reference to embodiments. The accompanying drawings relate to embodiments of the disclosure and are described in the following:

Other objects, advantages and novel features of the present invention will become apparent from the following detailed description of one or more preferred embodiments when considered in conjunction with the accompanying drawings.

DETAILED DESCRIPTION OF THE DRAWINGS

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

Although the embodiments of the present disclosure are described with reference to a vehicle, it is to be understood that the present disclosure is not limited thereto and that the embodiments described herein may be implemented in and/or used with a number of different types of UE devices, including but not limited to cellular phones, tablet computers, wearable computing devices, portable media players, vehicles, and any of various other computing devices.

Figure 1:
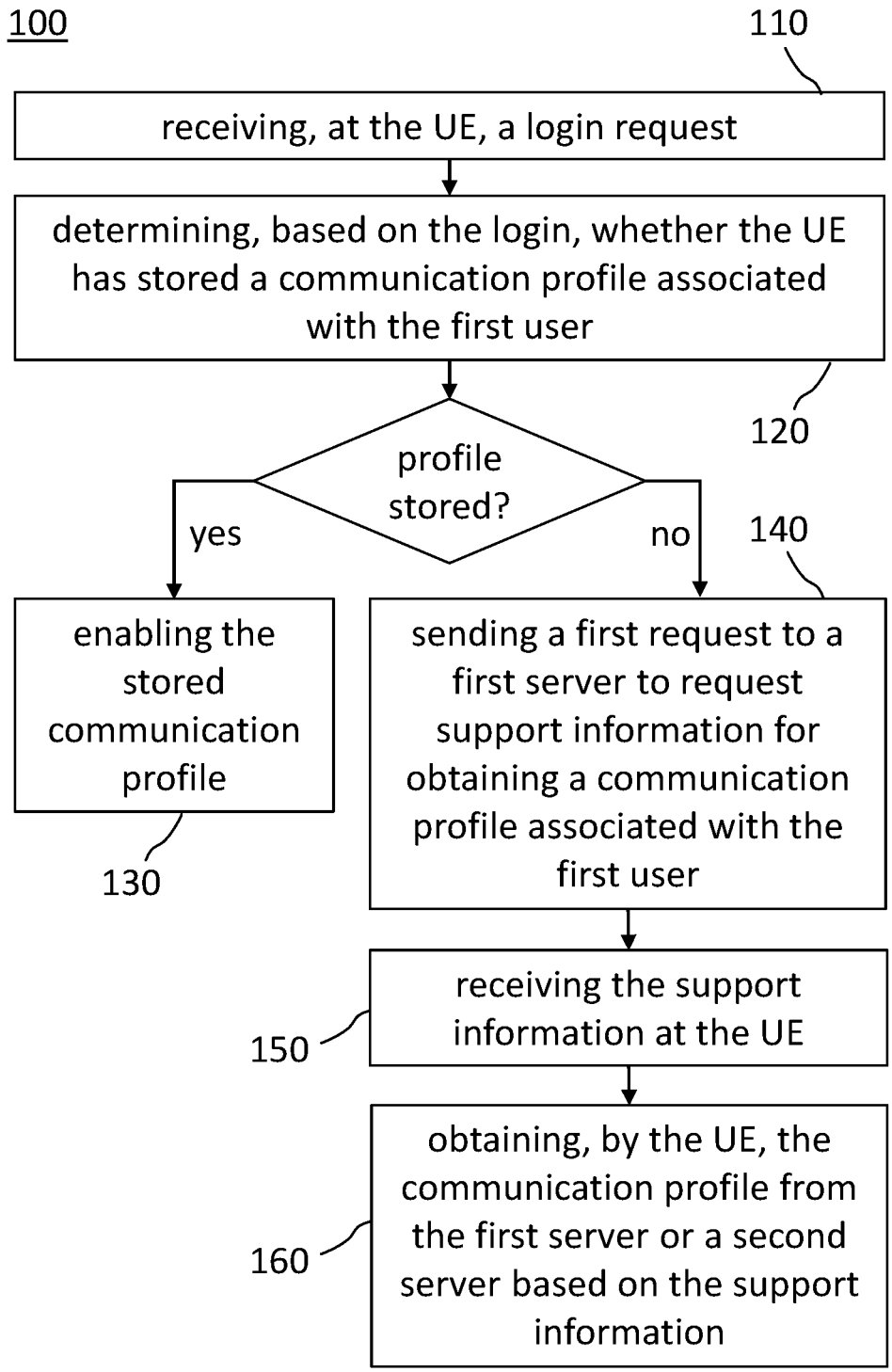
FIG. 1 shows a flow chart of a method for providing a communication function in a user equipment according to embodiments described herein.

FIG. 1 shows a flow chart of a method 100 for providing a communication function in a user equipment according to embodiments described herein.

The method 100 includes in block 110 receiving, at the user equipment, a login request from the first user to log the first user in to the user equipment; and in block 120 determining, by the user equipment, based on the login, whether the user equipment has stored a communication profile associated with the first user.

In particular, the first user is known to the user equipment through the login. This may be due to the possibility that during the login process the user equipment communicates with the first server, which may have stored all relevant information, e.g., in a user profile of the first user. The user equipment may then obtain information necessary to determine whether the user equipment has stored a communication profile associated with the first user.

In some embodiments, the communication profile is a CSIM or an eSIM profile of the first user.

The login request is received at a user interface of the user equipment, or an external entity connected to the user equipment. The user interface of the user equipment may be a Human Machine Interface (HMI), and may include, or be, a Touchscreen. The external entity may be, for example, a mobile terminal of the first user.

If it is determined that the user equipment has stored a communication profile associated with the first user, the method 100 includes in block 130 enabling the stored communication profile to provide the communication function for the first user.

Optionally, it can be checked whether communication functionalities, such as eSIM functionalities, have been previously enabled for the first user (e.g., via a so-called onboarding). If not, the first user may be directed to the account-federation with his/her MNO to enable eSIM functionalities. If it is determined that communication functionalities have been previously enabled for the first user, block 130 may be executed. It is noted that this check can be done before or after the determining whether the user equipment has stored a communication profile associated with the first user.

If it is determined that the user equipment does not have a communication profile associated with the first user stored, the method 100 includes in block 140 sending, by the user equipment, a first request to a first server to request support information for obtaining a communication profile associated with the first user; in block 150 receiving, at the user equipment, the support information from the first server; and in block 160 obtaining, by the user equipment, the communication profile from the first server or a second server based on the support information.

The first request may include at least one of user equipment identification information (e.g., a Vehicle Identification Number, VIN), Subscriber Identity Module information (e.g., an EID), and user information. The user information may be sent to the first server so that the first request can be mapped to a logged-in user. In some embodiments, the user information can be a Customer (C)-ID. It should be noted that the communication between the first server and the second server described later may not include the user information, such as the C-ID. Instead, communication between the first server and the second server may use a token generated by the second server.

According to some embodiments, the support information can include an activation code for the communication profile. The activation code can be used to request the communication profile from the first server or the second server.

In some embodiments, the support information further includes at least one of Subscriber Identity Module information (e.g., an EID), a communication profile type (e.g., "personal" if the profile is assignable to one user only, or "default" if the profile is assignable to different users), user information (e.g., the C-ID), and a confirmation code (optional). The confirmation code can be used by the second server to verify that the first user wants to use the communication profile in the user equipment. In particular, the first user can be asked whether he/she really wants to download the communication profile.

In some embodiments the method 100 may further include enabling, by the user equipment, the communication profile obtained from the first server or second server.

The step of obtaining, by the user equipment, the communication profile from the first server or a second server based on the support information may include sending, by the user equipment, a second request to the first server to request a download of the communication profile from the first server. Preferably, the first server obtains the communication profile from the second server using any suitable process.

Alternatively, the step of obtaining, by the user equipment, the communication profile from the first server or a second server based on the support information can include sending, by the user equipment, a second request to the second server to request a download of the communication profile from the second server. Accordingly, the user equipment may directly obtain the communication profile from the second server by communicating with the second server.

According to some embodiments, the method 100 further includes determining, by the user equipment, whether sufficient memory is available, e.g., on a storage medium of the user equipment, for installation of the communication profile.

Preferably, the memory is provided by (a storage medium of) a Universal Integrated Circuit Card, UICC, in particular an eUICC.

If it is determined that sufficient memory is available, the communication profile obtained from the first server or second server is installed e.g. on the eUICC. The installing of the communication profile may be done according to the GSMA standard.

If it is determined that sufficient memory is not available, at least one other communication profile stored in the user equipment can be deleted before the new communication profile is installed. The at least one other communication profile may be an unknown communication profile, a least used communication profile, a recently least used communication profile, and/or an oldest communication profile.

The term "sufficient memory" is to be understood in the sense that the memory contains sufficient free storage to install and enable the communication profile. In some embodiments, the memory or total memory available for storing communication profiles may by preset. Optionally, the memory or total memory available for storing communication profiles may be changeable, e.g., in the user equipment and/or by the first server.

According to some embodiments, the method 100 further includes receiving, at the user equipment, a communication profile deletion request from the first user; and deleting the communication profile according to the communication profile deletion request. Preferably, the deletion request is received at the user interface of the user equipment, or the external entity connected to the user equipment.

In some implementations, the method 100 further includes receiving, at the user equipment, a logout request to log the first user out; and disabling the communication profile. Preferably, the logout request is received at the user interface of the user equipment, or the external entity connected to the user equipment.

In some cases, the first user may lend his/her car to a second user, where the first user does not want the second user to use his/her communication profile. The first user can then remotely prevent the second user from using the communication profile by the method 200 shown in FIG. 2. In some embodiments, the second user may log in with their own account and thus use their own communication profile. Also in this case, the use of the first user's communication profile may be prevented.

Figure 2:
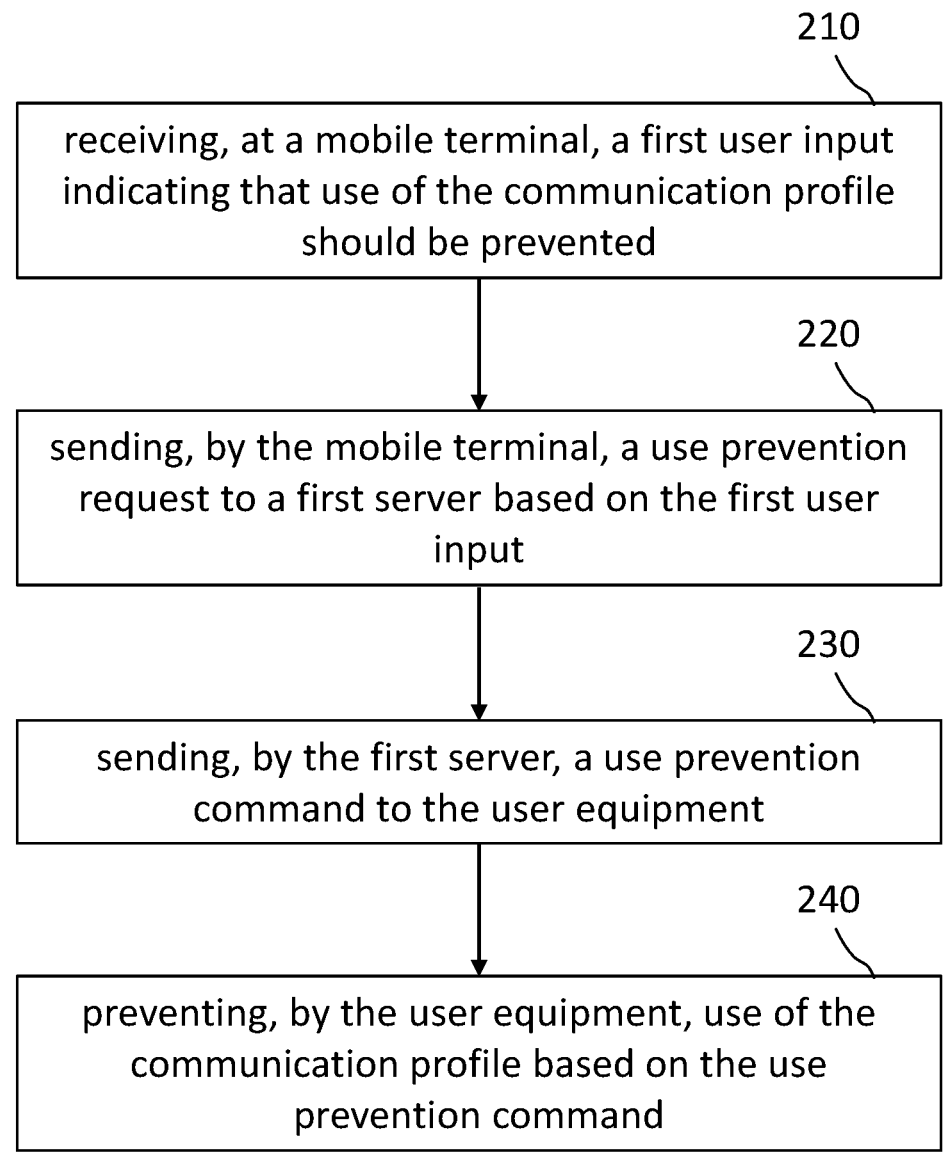
FIG. 2 shows a flow chart of a method for managing a communication function in a user equipment according to embodiments described herein.

FIG. 2 shows a flow chart of a method 200 for managing a communication function in a user equipment according to embodiments described herein. The method 200 may succeed the method 100 described with respect to FIG. 1.

The method 200 includes in block 210 receiving, at a mobile terminal, a first user input indicating that use of the communication profile should be prevented; in block 220 sending, by the mobile terminal, a use prevention request to the first server based on the first user input; in block 230 sending, by the first server, a use prevention command to the user equipment; and in block 240 preventing, by the user equipment, use of the communication profile based on the use prevention command.

The first user input may be received from the first user. For example, the first user may use an application (App) on his/her mobile terminal to prevent the use of the communication profile by the second user. In particular, the first user may be a user who is not currently using the user equipment, and the second user may be a user who is currently using the user equipment. For example, the first user may lend his/her car to the second user, where the first user does not want the second user to use his/her communication profile (the first user can share his login credentials with the second user; for example, the login can be associated with a key, or the second user can enter the first user's username and password without identifying himself as the second user). The first user can then remotely prevent the second user from using the communication profile.

In some embodiments, the method 200 can include preventing enabling of the communication profile if the communication profile has not been enabled yet. For example, if the second user or a user equipment access device carried by the second user has not yet logged in to the user equipment, the enabling of the communication profile can be prevented as a precaution. Alternatively, the communication profile may be disabled if the communication profile has already been enabled before the use prevention command is received. For example, if the second user or a user equipment access device carried by the second user has already logged in to the user equipment, the communication profile enabled by the login can be disabled again.

According to some embodiments, the method 200 further includes receiving, at the mobile terminal, a second user input indicating that the use of the communication profile should no longer be prevented; sending, by the mobile terminal, a use permission request to the first server based on the second user input; sending, by the first server, a use permission command to the user equipment; and permitting, by the user equipment, use of the communication profile. Accordingly, the previously prevented use of the communication profile may be allowed again, e.g., if the first user uses the user equipment after the second user has used it.

Figure 3:
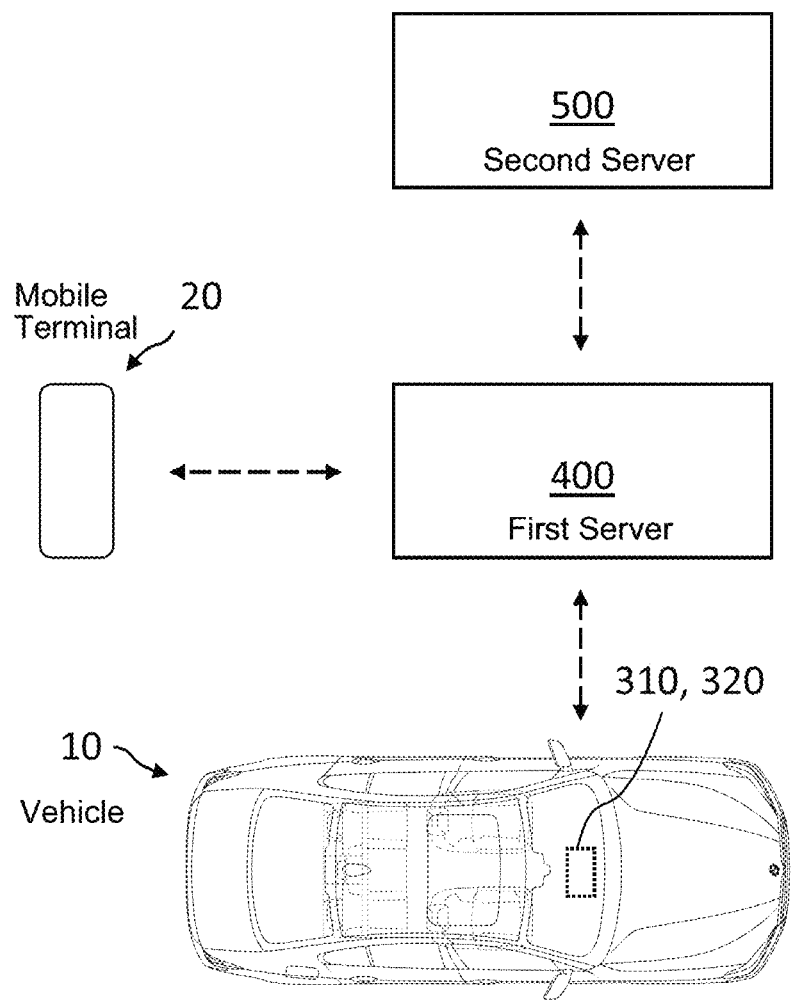
FIG. 3 shows a mobile terminal, a user equipment, a management server, and an MNO server according to embodiments described herein.

FIG. 3 shows a schematic view of a vehicle (UE) 10, a mobile terminal 20, a first server 400, and a second server 500 according to embodiments described herein. However, the present disclosure is not limited thereto, and the embodiments may be implemented in and/or used with a number of different types of UE devices, including, but not limited to, cellular phones, tablet computers, wearable computing devices, portable media players, and any of various other computing devices.

The vehicle 10 includes a communication module 310 and a management module 320 for the communication module 310. In some embodiments, the communication module 310 and the management module 320 are integrated in a single hardware and/or software module. In further embodiments, the communication module 310 and the management module 320 can be provided as separate hardware and/or software modules.

The term "module" as used throughout the present application may be understood in the sense of hardware components and software components or software instances which are designed to implement different tasks of the embodiments of the present disclosure.

The communication module 310 may include one or more sub-modules used for communication purposes, such as a Local Profile Assistant (LPA), a modem, and an eUICC.

The management module 320 may include a communication interface configured for communication with the communication module 310 and at least one server, such as the first server 400 and optionally the second server 500. For example, the communication interface may use a dedicated UE communication profile for communication with the at least one server via a mobile network. The dedicated UE communication profile can be provided in the management module 320, the communication module 310 (e.g., the eUICC of the communication module 310), or another module.

The vehicle 10 and the first server 400 communicate via a transmission medium, such as a network. In a preferred embodiment, the network is a mobile network. The transmission medium may use any of various wireless communication technologies, or telecommunication standards, such as GSM, UMTS, LTE, LTE-Advanced (LTE-A), 5G, HSPA, and the like.

In some embodiments, the vehicle 10 and the second server 500 may communicate via the same network used for communication with the first server 400 or a different network. In alternative embodiments, the vehicle 10 does not communicate with the second server 500 at all or communicates with the second server 500 via the first server 400.

According to some embodiments, the first server 400 is a management server or backend for managing a plurality of UE devices. For example, the first server 400 can be owned and/or operated by a manufacturer of the UE devices, such as a car manufacturer. However, the present disclosure is not limited thereto, and the first server 400 may be owned and/or operated by another third party.

Additionally, or alternatively, the second server 500 is a mobile network operator, MNO, server or backend. The MNO may also be referred to as a wireless service provider, wireless carrier, cellular company, or mobile network carrier. The MNO can provide the communication profile for the first user.

The management module 320 includes the communication interface, and further includes a processor module to implement aspects of the methods described with respect to FIGS. 1 and 2.

In particular, the communication interface can be configured to receive a login request from the first user or information about a successful user login. The processor module can be configured to: determine, based on the login, whether the communication module 310 has stored a communication profile associated with the first user; if it is determined that the communication module 310 has stored a communication profile associated with the first user, initiate enabling of the stored communication profile; and, if it is determined that the communication module 310 does not have a communication profile associated with the first user stored, send a request to a first server 400 via the communication interface to request support information for obtaining a communication profile associated with the first user.

The communication interface can be further configured to receive the support information from the first server 400. The management module 320 can be further configured to obtain (e.g., download) the communication profile from the first server 400 or second server 500 based on the support information and install the communication profile on, for example, the eUICC of the communication module 200.

In some embodiments, the communication profile obtained from the first server 400 or second server 500 and installed on the eUICC of the communication module 200 can be enabled by the LPA of the communication module 200.

The communication interface may be further configured to receive a use prevention command from the first server 400. The management module 320 may be configured to prevent the use of the communication profile based on the use prevention command.

For example, the first user may use his/her mobile terminal 20 to remotely request that the use of the communication profile should be temporarily prevented. In particular, the mobile terminal 20 may send a use prevention request to the first server 400, and the first server 400 may send the use prevention command to the user equipment 10 based on the use prevention request.

Figure 4:
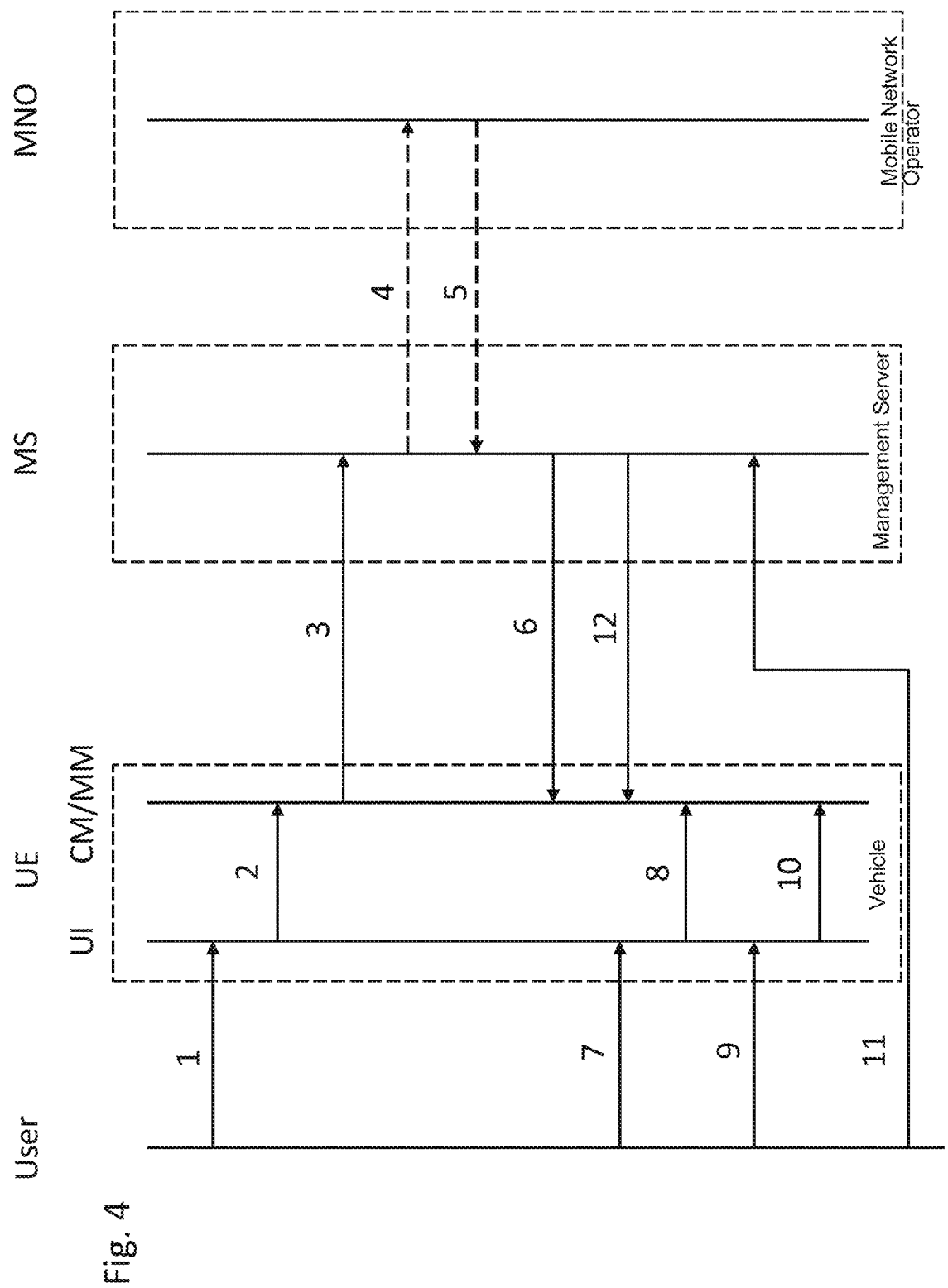
FIG. 4 shows a messaging process for providing and managing a communication function in a user equipment according to embodiments described herein.

FIG. 4 shows a messaging process for providing and managing a communication function in a user equipment according to embodiments described herein.

FIG. 4 shows schematically a first user ("User"), a vehicle ("UE") having a user interface ("UI"), the communication module ("CM") and the management module ("MM"), a management server ("MS"), and an MNO server ("MNO").

The communication module CM and the management module MM can be integrated in a single hardware and/or software module. In further embodiments, the communication module CM and the management module MM can be provided as separate hardware and/or software modules.

The management module MM (e.g., the eSIM "brain" in the vehicle) handles the communication between the management server MS (e.g., a backend of the OEM or a 3rd party backend that performs the same function as the OEM backend) and the communication module CM in the vehicle in which the LPA, modem and SIM card are installed.

In the following, exemplary tasks of the management module MM are described.

Task 1: Download an eSIM Profile

The first user logs in to the vehicle (arrow 1). Based on the login, the vehicle recognizes the first user. The management module MM is notified about the login (arrow 2) and checks whether eSIM functionalities have been previously enabled for the first user (e.g., via a so-called onboarding). If not, the first user may be directed to the account-federation with his/her MNO to enable eSIM functionalities.

If eSIM functionalities are enabled (e.g., due to a general setup and/or account settings), the management module MM checks whether the first user has already loaded an eSIM profile or not. If the first user has loaded an eSIM profile, the process continues with Task 2 (enable eSIM profile). If the first user has not yet loaded an eSIM profile e.g. because the eSIM profile has been lost or deleted, or the first user is sitting in this vehicle for the first time, a new eSIM profile should be loaded for this user. To do this, the management module MM takes vehicle information, SIM card information and user information and requests an activation code from the management server MS (arrow 3).

The management server MS now exchanges information with the MNO (arrow 4) and receives an activation code (arrow 5). The management server MS sends the activation code to the management module MM (arrow 6).

Before the management module MM sends the activation code to the LPA of the communication module CM, the management module MM checks whether there is enough space left on the SIM card to install another eSIM profile.

Task 2: Activate eSIM Profile (Enable)

Each time the first user or a user equipment access device associated with the first user logs in, the corresponding eSIM profile must be enabled. The reason for this is that the eSIM profiles must be disabled for security reasons when the first user or the user equipment access device associated with the first user logs out. To enable the eSIM profile (either the previously stored eSIM profile or the downloaded new eSIM profile), the management module MM sends a profile ID to the LPA of the communication module CM. The LPA enables the eSIM profile and then sends the result to the management module MM. The management module MM send this information as well as other status information of the SIM card and the eSIM profile to the management server MS.

Task 3: Deactivate eSIM Profile (Disable)

Each time the first user logs or the user equipment access device associated with the first user out (arrows 9 and 10), the corresponding eSIM profile must be disabled. The reason for this is that the profiles must be protected in case of absence. This is not necessary for a cell phone or a watch, as these devices are not passed on to other users.

The management module MM instructs the LPA to disable the eSIM profile. The LPA disables the eSIM profile and then sends the result to the management module MM. The management module MM sends the result as well as other status information of the SIM card and the profile to the management server MS. In case of a successful disablement the process is finished. In case of an unsuccessful disablement or error a deletion process is triggered, because an eSIM profile that cannot be disabled represents a security risk (see Task 4).

Task 4: Delete eSIM Profile

In a first example, if the first user wants to delete an eSIM profile (in the car, via app, etc.; arrows 7 and 8), then the management module MM sends a delete command to the LPA to delete this very eSIM profile.

In a second example, one of multiple users logs in to the vehicle and wants to load an eSIM profile. If there is not enough memory on the SIM card, an eSIM profile must be deleted first. After deleting the eSIM profile, a new eSIM profile can be install on the SIM card.

In a third example, the management module MM can delete eSIM profiles which are installed but not assigned to any specific users.

Task 5: Temporarily Prevent Use of eSIM Profile

In some cases, the first user may lend his/her car to a second user, where the first user does not want the second user to use his/her communication profile. The first user can then remotely prevent the second user from using the communication profile by the following process.

The first user may use his/her mobile terminal to request that the use of the communication profile should be prevented. The mobile terminal may send a corresponding use prevention request to the management server MS (arrow 11). The management server MS may then send a use prevention command to the user equipment US (arrow 12) based on the use prevention request.

While the foregoing is directed to embodiments of the disclosure, other and further embodiments of the disclosure may be devised without departing from the basic scope thereof, and the scope thereof is determined by the claims that follow.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of managing a communication function in a user equipment, wherein the user equipment has a communication profile associated with a first user, the method comprising:
  receiving, at a mobile terminal, a first user input indicating that use of the communication profile should be prevented;
  sending, by the mobile terminal, a use prevention request to a first server based on the first user input;
  sending, by the first server, a use prevention command to the user equipment;
  preventing, by the user equipment, use of the communication profile based on the use prevention command;
  receiving, at the user equipment, a login request; and
  in a case that the use prevention command has not been received from the first server, enabling the communication profile based on the login request; and
  in a case that the use prevention command has been received from the first server, preventing enabling the communication profile.

2. The method of claim 1, wherein, in a case that the communication profile has not been enabled yet, the preventing, by the user equipment, the use of the communication profile includes preventing, by the user equipment, enabling of the communication profile.

3. The method of claim 1, wherein, in a case that the communication profile has been enabled, the preventing, by the user equipment, the use of the communication profile includes disabling, by the user equipment, the communication profile.

4. The method of claim 1, wherein the login request is received from, or associated with, a second user different from the first user.

5. The method of claim 1, wherein the login request is received from, or via, a user equipment access device associated with the first user.

6. The method of claim 1, further comprising:
  receiving, at the mobile terminal, a second user input indicating that the use of the communication profile should no longer be prevented;
  sending, by the mobile terminal, a use permission request to the first server based on the second user input;
  sending, by the first server, a use permission command to the user equipment; and
  permitting, by the user equipment, use of the communication profile based on the use permission command.

7. The method of claim 6, wherein the permitting, by the user equipment, the use of the communication profile includes enabling the communication profile.

8. The method of claim 1,
  wherein the login request is to log the first user in to the user equipment, the method further comprising:
  determining, by the user equipment, based on the login request, whether the first user equipment has a communication profile associated with the first user;
  in a case that it is determined that the user equipment has a communication profile associated with the first user, enabling the stored communication profile;
  in a case that it is determined that the user equipment does not have stored a communication profile associated with the first user:
    sending, by the user equipment, a first request to the first server to request support information for obtaining a communication profile associated with the first user;
    receiving, at the user equipment, the support information from the first server; and
    obtaining, by the user equipment, the communication profile from the first server or a second server based on the support information.

9. A non-transitory computer-readable storage medium having computer-executable instructions stored, that, when executed, cause a one or more processors to perform a method comprising:
  receiving, at a mobile terminal, a first user input indicating that use of the communication profile should be prevented;
  sending, by the mobile terminal, a use prevention request to a first server based on the first user input;
  sending, by the first server, a use prevention command to the user equipment;
  preventing, by the user equipment, use of the communication profile based on the use prevention command;
  receiving, at the user equipment, a login request; and
  in a case that the use prevention command has not been received from the first server, enabling the communication profile based on the login request; and
  in a case that the use prevention command has been received from the first server, preventing enabling the communication profile.

10. The non-transitory computer-readable storage medium according to claim 9, wherein, in a case that the communication profile has not been enabled yet, the preventing, by the user equipment, the use of the communication profile includes preventing, by the user equipment, enabling of the communication profile.

11. The non-transitory computer-readable storage medium according to claim 9, wherein, in a case that the communication profile has been enabled, the preventing, by the user equipment, the use of the communication profile includes disabling, by the user equipment, the communication profile.

12. The non-transitory computer-readable storage medium according to claim 9, wherein the login request is received from, or associated with, a second user different from the first user.

13. The non-transitory computer-readable storage medium according to claim 9, wherein the login request is received from, or via, a user equipment access device associated with the first user.

14. The non-transitory computer-readable storage medium according to claim 9, further comprising:
  receiving, at the mobile terminal, a second user input indicating that the use of the communication profile should no longer be prevented;
  sending, by the mobile terminal, a use permission request to the first server based on the second user input;
  sending, by the first server, a use permission command to the user equipment; and
  permitting, by the user equipment, use of the communication profile based on the use permission command.

15. The non-transitory computer-readable storage medium according to claim 14, wherein the permitting, by the user equipment, the use of the communication profile includes enabling the communication profile.

16. The non-transitory computer-readable storage medium according to claim 9,
  wherein the login request is to log the first user in to the user equipment, the method further comprising:

determining, by the user equipment, based on the login request, whether the first user equipment has a communication profile associated with the first user;

in a case that it is determined that the user equipment has a communication profile associated with the first user, enabling the stored communication profile;

in a case that it is determined that the user equipment does not have stored a communication profile associated with the first user:
sending, by the user equipment, a first request to the first server to request support information for obtaining a communication profile associated with the first user;
receiving, at the user equipment, the support information from the first server; and
obtaining, by the user equipment, the communication profile from the first server or a second server based on the support information.

17. A system for managing a communication function in a user equipment, the system comprising:
one or more processors; and
a memory coupled to the one or more processors and comprising instructions executable by the one or more processors to implement a method comprising:
receiving, at a mobile terminal, a first user input indicating that use of the communication profile should be prevented;
sending, by the mobile terminal, a use prevention request to a first server based on the first user input;
sending, by the first server, a use prevention command to the user equipment;
preventing, by the user equipment, use of the communication profile based on the use prevention command;
receiving, at the user equipment, a login request; and
in a case that the use prevention command has not been received from the first server, enabling the communication profile based on the login request; and
in a case that the use prevention command has been received from the first server, preventing enabling the communication profile.

* * * * *